United States Patent [19]
Mullinax

[11] Patent Number: 5,368,652
[45] Date of Patent: Nov. 29, 1994

[54] METHOD FOR PURGING AND DECONTAMINATING A PRODUCT-CONTAINING STORAGE DRUM

[75] Inventor: Charles H. Mullinax, Charlotte, N.C.
[73] Assignee: Industrial Piping, Inc., Pineville, N.C.
[21] Appl. No.: 178,517
[22] Filed: Jan. 7, 1994

Related U.S. Application Data
[62] Division of Ser. No. 96,670, Jul. 23, 1993.
[51] Int. Cl.$^5$ .......................... B08B 3/02; B08B 7/04; B08B 9/12
[52] U.S. Cl. .................... 134/22.18; 134/25.4; 134/27
[58] Field of Search .............. 134/8, 22.18, 24, 25.4, 134/27, 59, 62, 66, 68, 72, 82, 83

[56] References Cited

U.S. PATENT DOCUMENTS
| | | | |
|---|---|---|---|
| 2,115,202 | 4/1938 | Kimball | 141/6 |
| 2,785,694 | 3/1957 | Walde | 134/46 |
| 3,419,147 | 12/1968 | Corby | 210/152 |
| 3,739,471 | 6/1973 | Peres | 134/62 X |
| 4,058,412 | 11/1977 | Knapp et al. | 134/24 |
| 4,087,670 | 5/1978 | Miller | 219/121.39 |
| 4,628,972 | 12/1986 | LaRochelle | 141/91 |
| 4,698,480 | 10/1987 | Klingel | 219/121.67 |

OTHER PUBLICATIONS
Barrel Reconditioning Industries, Inc., "Automatic Barrel Reconditioning System," 1990.

*Primary Examiner*—Philip R. Coe
*Attorney, Agent, or Firm*—W. Thad Adams, III

[57] ABSTRACT

A drum processing apparatus serves to purge and decontaminate successive product-containing storage drums. The drum processing apparatus includes a drum deheading station, a drum emptying station, and at least one drum cleaning station. The drum deheading station includes high frequency torch or non-flammable cutting device for removing a lid of the drum to provide an opening at one end of the drum. The drum emptying station includes a drum invertor for emptying the contents of the drum through the opening in the drum. The drum cleaning stations are located downstream of the drum emptying station, and function to remove contaminants from the interior and exterior surfaces of the drum. A drum table moves the successive drums downstream from the drum deheading station to the drum emptying station and the drum cleaning station.

4 Claims, 9 Drawing Sheets

METHOD FOR PURGING AND DECONTAMINATING A PRODUCT-CONTAINING STORAGE DRUM

This application is a divisional of application Ser. No. 08/096,670, filed on Jul. 23, 1993 pending.

TECHNICAL FIELD AND BACKGROUND OF THE INVENTION

This invention relates to a drum processing apparatus and method for purging and decontaminating successive product-containing storage drums. The invention is designed particularly for processing storage drums in an efficient and environmentally safe manner so that the drums may be properly discarded or reconditioned for reuse.

The processing of product-containing storage drums may create a dangerous and unhealthy work environment by subjecting workers to various toxic particles entrained in the air stream. Typically, the polluted air results directly from the processing of storage drums containing hazardous materials. In an attempt to alleviate this problem and create a healthy atmosphere for workers, OSHA and various environmental groups have recommended and established health and safety guidelines to be followed by company plants. Thus, a need has developed in the industry to provide an effective and efficient drum processing apparatus for reconditioning or disposal of product-containing storage drums which conforms to these health and safety guidelines.

The waste management and disposal of certain product-containing storage drums can be a substantial problem, especially when handling dangerous, toxic materials. Consideration must be given not only to proper disposal of the product, but also to the disposal of the storage drum. Several machines of the prior art provide for reconditioning of product-containing storage drums. These machines are designed to subject the drum to a series of drum cleaning stages, without damaging the drum so that it may be reused. However, drums in poor condition or those highly contaminated are not candidates for reconditioning and reuse, and must therefore be cleaned and discarded.

The present invention provides a means for processing several drums in succession for subsequent waste disposal. The invention is designed to process heavily damaged storage drums, and those containing various environmentally hazardous materials. Additionally, the present invention may be utilized for reconditioning drums for reuse. Once reconditioned, the invention may include a fill device for refilling the drums with a particular liquid or powder product.

SUMMARY OF THE INVENTION

Therefore, it is an object of the invention to provide a drum processing apparatus which purges and decontaminates product-containing storage drums in succession for subsequent disposal or reuse.

It is another object of the invention to provide a drum processing apparatus which effectively handles toxic or acidic dust entrained in the air stream and resulting from drum processing to conform to various health and safety guidelines established by OSHA.

It is another object of the invention to provide a drum processing apparatus which processing a product-containing storage drum every 1½-3 minutes.

It is another object of the invention to provide a drum processing apparatus which is completely automated, utilizing a program logic control unit (PLC) for operating each of the various components of the apparatus.

It is another object of the invention to provide a drum processing apparatus which initially cuts and removes the lid of the drum before cleaning.

It is another object of the invention to provide a drum processing apparatus which inverts the drum after lid removal to empty the contents of the drum.

It is another object of the invention to provide a drum processing apparatus which treats of the contents of the drum after the contents has been emptied from the drum.

It is another object of the invention to provide a drum processing apparatus which includes a processing area for cleaning and disposing of drum lids.

It is another object of the invention to provide a drum processing apparatus which includes a neutralizing, high-pressure spray rinse station to neutralize drum surface contaminants.

It is another object of the invention to provide a drum processing apparatus which includes a brush and rinse station for removing contaminant film from the drum interior.

It is another object of the invention to provide a drum processing apparatus which includes a drum dryer station for drying the drum before disposal.

It is another object of the invention to provide a drum processing apparatus which includes a drum disposal machine for scrapping or crushing the drum once the drum has been fully cleaned.

These and other objects of the present invention are achieved in the preferred embodiments disclosed below by providing a drum processing apparatus for purging and decontaminating successive product-containing storage drums. The drum processing apparatus includes a drum deheading station, a drum emptying station, and at least one drum cleaning station. The drum deheading station includes deheading means for removing a lid of the drum to provide an opening at one end of the drum. The drum emptying station includes emptying means for emptying the contents of the drum through the opening in the drum. The drum cleaning stations are located downstream of the drum emptying station, and function to remove contaminants from the interior and exterior surfaces of the drum. A conveying means moves the successive drums downstream from the drum deheading station to the drum emptying station and the drum cleaning station.

According to one preferred embodiment of the invention, the deheading means is a high frequency torch generated by high speed gases to create a flame jet suitable for cutting hard metals.

Preferably, the high frequency torch is a plasma torch generated by high speed plasma gas.

According to another preferred embodiment of the invention, the drum deheading means is a non-flammable, explosion-proof cutting device for severing the lid of the drum as the cutting device is rotated substantially 360 degrees relative to the drum.

According to one preferred embodiment of the invention, the drum emptying means is a drum invertor for substantially inverting the drum to thereby empty the contents of the drum.

Preferably, a discharge hopper is located beneath the drum invertor for receiving the contents of the drum as the drum is inverted and emptied.

According to another preferred embodiment of the invention, the at least one drum cleaning station includes a first rinse station having at least one high-pressure spray nozzle for rinsing the interior and exterior surfaces of the drum with a cleansing fluid.

Preferably, a portable tank is located beneath the first rinse station for collecting the cleansing fluid and any contents remaining in the drum after the drum has been emptied.

According to another preferred embodiment of the invention, the at least one drum cleaning station further includes a brush station downstream of the first rinse station, and having a vertically reciprocating brush rotatably mounted for cleaning the interior surface of the drum.

According to yet another preferred embodiment of the invention, the at least one drum cleaning station further includes a neutralizing station downstream of the first rinse station and having at least one high-pressure spray nozzle for rinsing the interior and exterior surfaces of the drum with a neutralizing liquid solution.

Preferably, a containment tank is located beneath the neutralizing station for collecting the neutralizing liquid solution, and for recycling the neutralizing liquid solution through the high-pressure spray nozzles.

According to yet another preferred embodiment of the invention, the at least one drum cleaning station further includes a second rinse station downstream of the first rinse station, and having at least one high-pressure spray nozzle for rinsing the interior and exterior surfaces of the drum with cleansing fluid.

According to yet another preferred embodiment of the invention, the at least one drum cleaning station further includes a dryer station downstream of the first rinse station, and having a blower for substantially drying the drum, and a drip pan located beneath the drum for collecting fluid from the drum.

According to one preferred embodiment of the invention, the drum conveying means includes a laterally reciprocating drum table supported by opposing guide rails for carrying the drum downstream from the drum deheading station to the drum emptying station and drum cleaning station.

Preferably, the drum table has a opening formed therein for allowing the interior surface of the drum to be cleaned while the drum is in an inverted position carried by the drum table.

Preferably, a drum disposal device is located downstream of the at least one drum cleaning station for disposing of the drum once the drum has been emptied and cleaned.

Preferably, a lid cleaning means serves to clean and decontaminate the lid of the drum.

A method of purging and decontaminating successive product-containing storage drums includes placing the drum on a conveyer for moving the drum downstream to successive drum processing stations. A lid of the drum is first removed in a drum deheading station to provide an opening at one end of the drum. The contents of the drum are then emptied through the opening in the drum in a drum emptying station. The drum is then cleaned in at least one drum cleaning station downstream of the drum emptying station to remove contaminants from the interior and exterior surfaces of the drum.

According to one preferred embodiment of the invention, the lid removing step includes the step of applying a high frequency plasma torch to the exterior surface of the drum.

According to another preferred embodiment of the invention, lid removing step includes the step of applying a non-flammable, explosion-proof cutting device to the lid of the drum and then rotating the cutting device substantially 360 degrees relative to the drum to thereby separate the lid from the drum.

According to yet another preferred embodiment of the invention, the drum emptying step includes the step of placing the drum in a drum invertor for substantially inverting the drum to thereby empty the contents.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Figure 1:
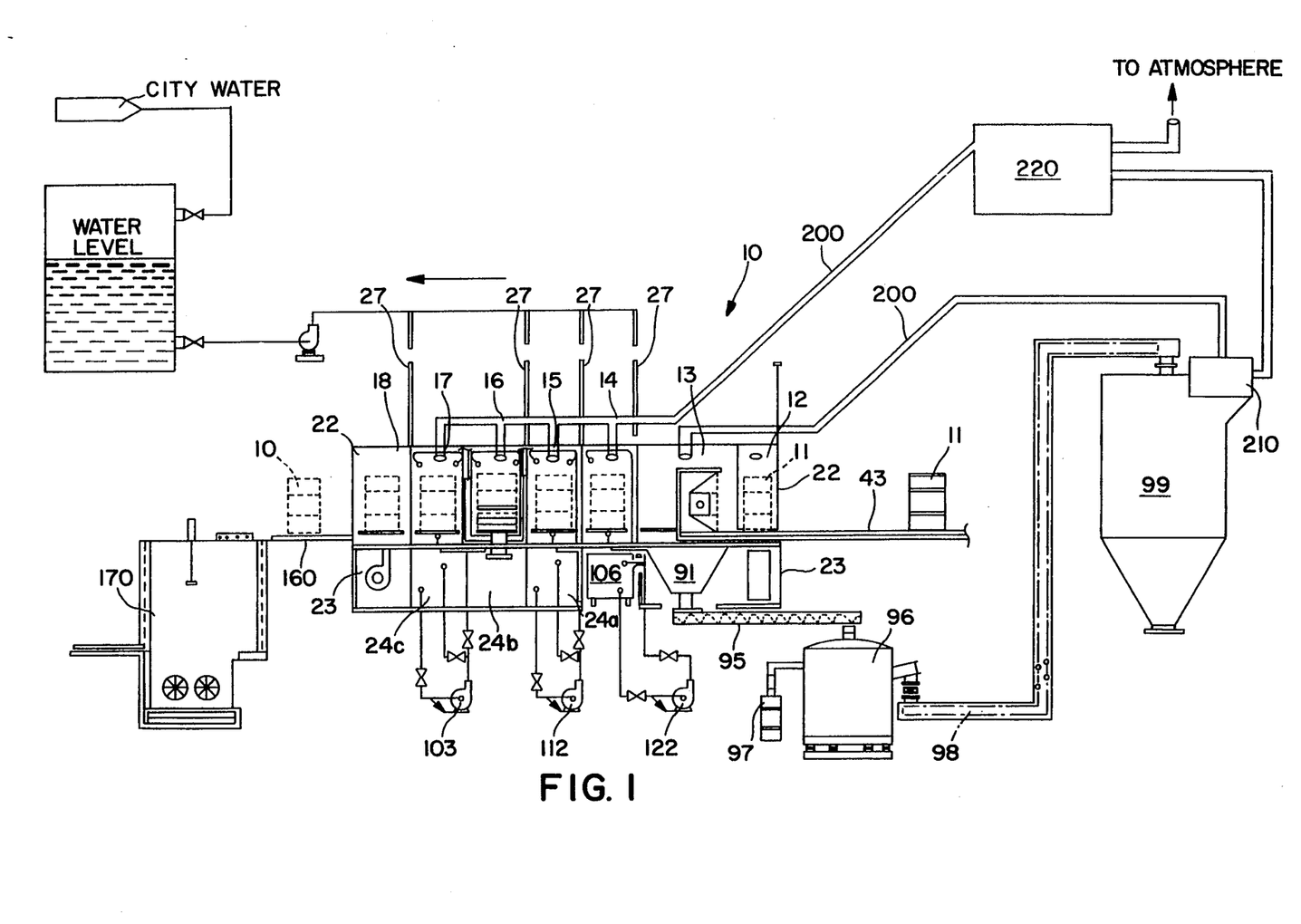
FIG. 1 is a side elevation of the invention illustrating the drums in phantom in each of the drum processing stations.

Referring now specifically to the drawings, a drum processing apparatus according to the present invention is illustrated in FIG. 1 and shown generally at reference numeral 10. The drum processing apparatus 10 is designed particularly for handling product-containing storage drums 11 such as those ranging in size from 30 to 55 gallons.

The drum processing apparatus 10 has a dry-end portion including a drum deheading station 12 and a drum emptying station 13, and a wet-end portion including a series of drum cleaning stations 14, 15, 16, and 17, and a drum dryer station 18. As shown in FIG. 1, the drum processing apparatus 10 moves drums 11 in succession from a drum entrance side of the apparatus 10 to a drum exit side, through the drum processing stations 12–18 located therebetween. A drum exit conveyor 19 extends from the drum dryer station 18 to move drums further downstream to a drum disposal machine 170. Preferably, a single product-containing storage drum 11 is processed through the drum processing apparatus 10 every 1½–3 minutes.

Figure 2:
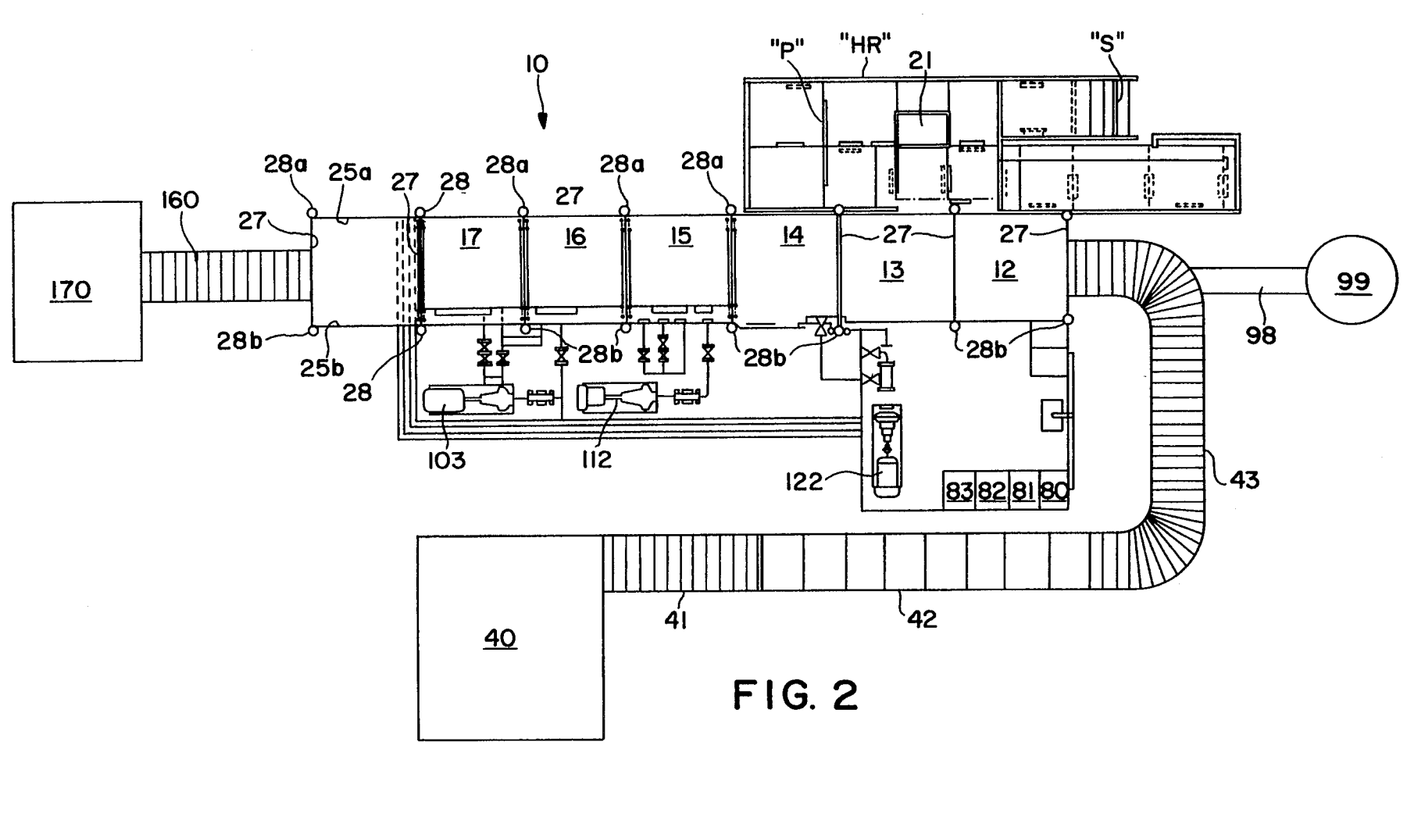
FIG. 2 is a top plan view of the invention including the various auxiliary components as located in a company plant.
Figure 3:
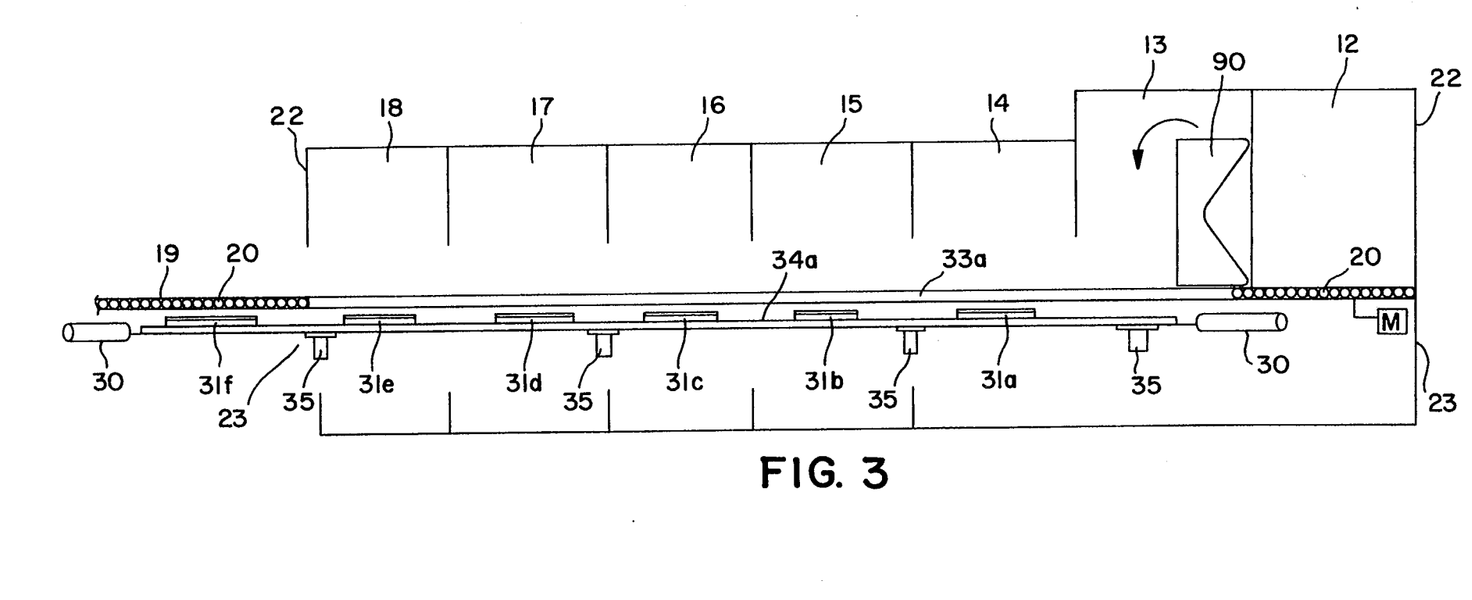
FIG. 3 is a side elevation of the invention illustrating particularly the drum conveying means.

Referring now to FIG. 2, a machine supervisor operates the drum processing apparatus 10 by means of a system control unit 21 located near the drum entrance side of the apparatus 10. The system control unit 21 contains all starters, timers, relays and switches for properly directing the drum 11 through the drum processing apparatus 10 from station to station. Additionally, the control unit 21 includes emergency stop switches to permit the supervisor to stop processing and adjust a particular drum 11 or machine element. Preferably, the system control unit 21 is positioned on an elevated platform "P" for permitting the supervisor to readily observe the downstream movement of successive drums 11 through the drum processing apparatus 10. Stairs "S" lead to the platform "P" and system control unit 21. Preferably, a safety hand rail "HR" surrounds this area.

According to another embodiment of the invention, the drum processing apparatus is fully automated. A program logic control (PLC) unit (not shown) would function to direct successive drums through each of the drum processing stations with virtually no physical operations required.

Referring to FIGS. 1 and 2, the frame structure of the drum processing apparatus 10 defines an upper cabinetry 22 and a lower cabinetry 23. The drums 11 are moved and processed through the upper cabinetry 22, while the lower cabinetry 23 houses components, such as containment tanks 24a, 24b, and 24c for fluid collection and recycling. As best shown in FIG. 2, the upper cabinetry 22 of each station 12-18 includes opposing side walls 25a and 25b, a top wall 26, and opposing vertical section doors 27 for separating one station from the next. Windows (not shown) are preferably located in a side wall 25a of each station 12-18 for permitting the supervisor to view the drums 11 within the apparatus 10 during processing. Additionally, a light with a glass bowl lens (not shown) is preferably located in each station 12-18 to light the interior of the station.

Figure 7:
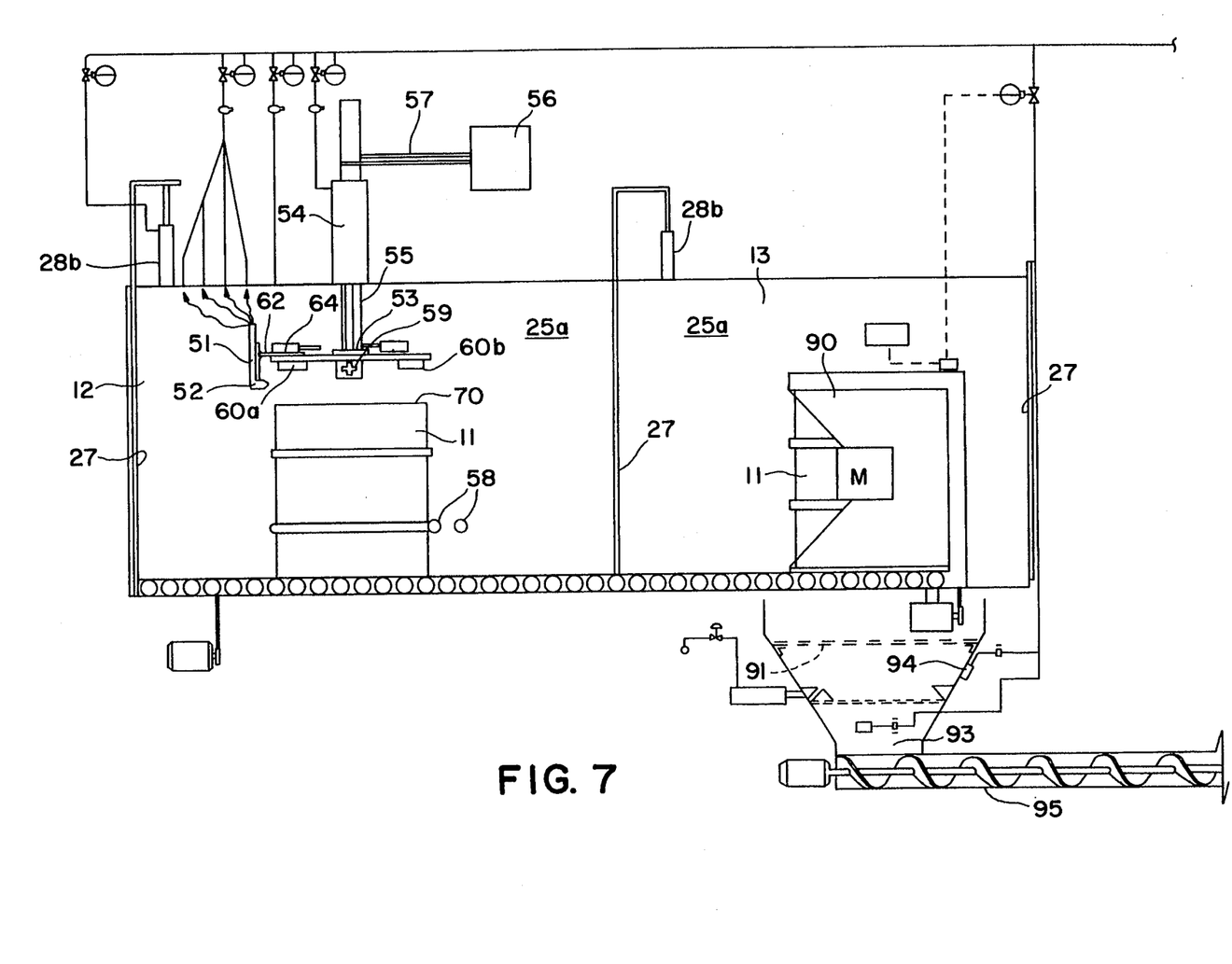
FIG. 7 is a side elevation of the drum deheading station and the drum emptying station.

The vertical section doors 27, as best shown in FIGS. 1, 2, and 7, are positioned between each station 12-18 to isolate the upper cabinetry 22 of respective stations 12-18 so that no cleaning fluid or other material is inadvertently passed between stations 12-18. Preferably, each door 27 includes a pair of pneumatic air cylinders 28a and 28b for sliding the door 27 upwardly or downwardly. Alternately, the air cylinders 28a and 28b would be hydraulic cylinders. The respective cylinders 28a,b include needle valves to adjust the vertical travel speed of the door. The doors 27 are designed to be raised and lowered simultaneously between the various stations 12-18 of the drum processing apparatus 10. Preferably, the system control unit 21 includes an indicator for signaling to the supervisor when the vertical sections doors 27 should be raised and lowered.

The drum processing apparatus 10 preferably includes a vacuum means for maintaining various drum processing stations and components of the apparatus 10 under a negative air pressure of approximately 2200 CFM, or 5-10 WC. As shown in FIG. 1, the vacuum means includes one or more pumps (not shown) and a duct assembly 200 communicating with the wet-end stations 14-17 of the apparatus and the dry-end stations 12 and 13. The duct assembly 200 for the dry-end stations 12 and 13 leads to a filter 210 for removing larger, potentially toxic particles from the air stream. From the filter 210, the air stream is directed to a scrubber 220 for further cleaning or filtering. From the scrubber 220, the air is finally released to the atmosphere in an environmentally safe condition. The duct communicating with the wet-end stations 14-17 moves the air stream directly to the scrubber 220 for filtering. Preferably each of the various auxiliary components and devices of the drum processing apparatus 10 are maintained under this negative air pressure to ensure that hazardous toxic or acidic particles do not become entrained in the air stream surrounding the work place.

Drum Conveying Means

Figure 4:
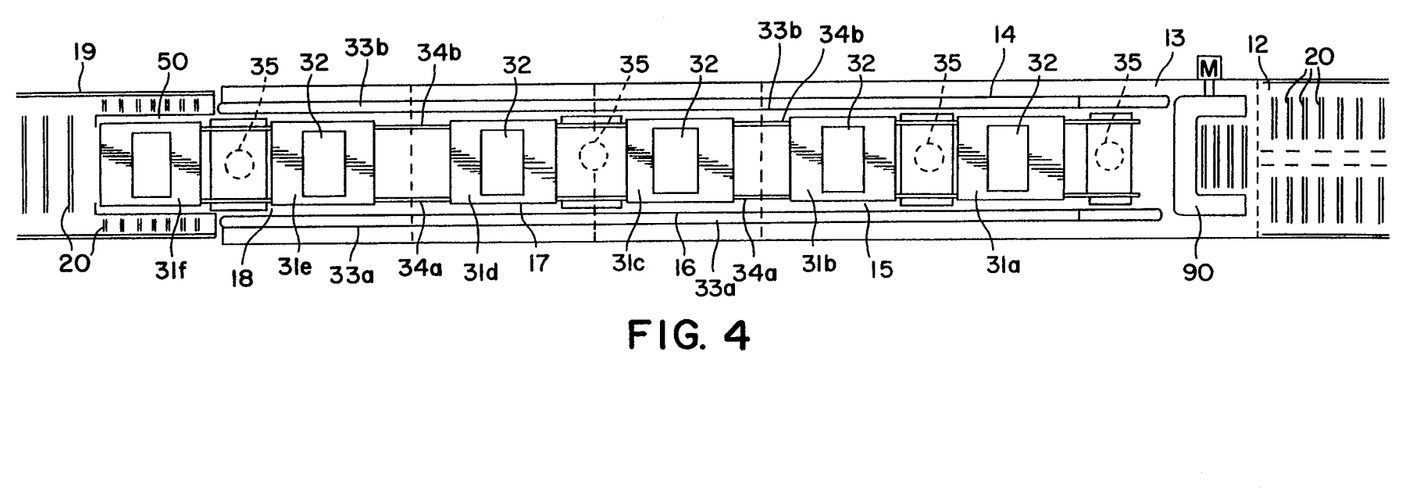
FIG. 4 is a top plan view of the drum conveying means illustrated in FIG. 3.

As shown in FIGS. 3-6, a drum conveying means separates the upper cabinetry 22 from the lower cabinetry 23 of the drum processing apparatus 10, and operates to move drums 11 in succession downstream from station to station. The conveying means preferably includes one drum table 31a-31f for each drum processing station 13-18. The drum deheading station 12 preferably includes motored rollers 20 for advancing the drum 11 once it has been deheaded. Additionally, the drum exit conveyor 19 includes motored rollers 20 for moving the drum 11 from the drum processing stations to a drum disposal machine 170 located downstream. As shown in FIG. 4, the drum exit conveyor 19 has an opening 50 into which the drum table 31f can move to place a drum 11 on the motored rollers 20.

The respective drum tables 31a-f are designed to simultaneously move downstream, carrying respective drums 11 to succeeding drum processing stations. Once the drums 11 have been deposited in the succeeding station, the drum tables 31 simultaneously move back upstream to their original positions within their respective drum processing stations. Each table 31 preferably has a center opening 32 (See FIGS. 4 and 5) formed therein through which a spray nozzle or brush can operate to clean the interior of the drum 11 during processing.

The drum tables 31a-f are positioned between a pair of spaced-apart and laterally extending drum support rails 33a and 33b for mounting the drums 11 during processing in a given station. A drum stabilizing device (not shown) including hold-down cylinders may engage the top of the drum 11 during processing to prevent the drum 11 from shifting due to high-pressure spray rinsing. Additionally, a set of laterally extending pilot rods (not shown) may be located in each station to prevent the drum 11 from tipping over or from becoming otherwise off-centered.

Figure 5:
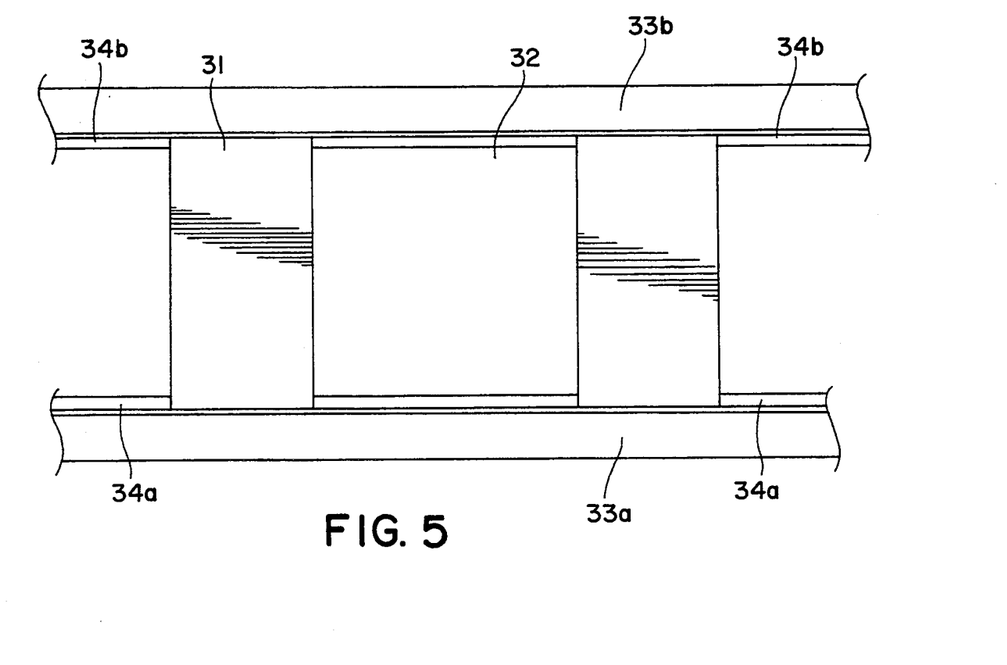
FIG. 5 is a top plan view of the drum table, support rails and guide rails.
Figure 6:
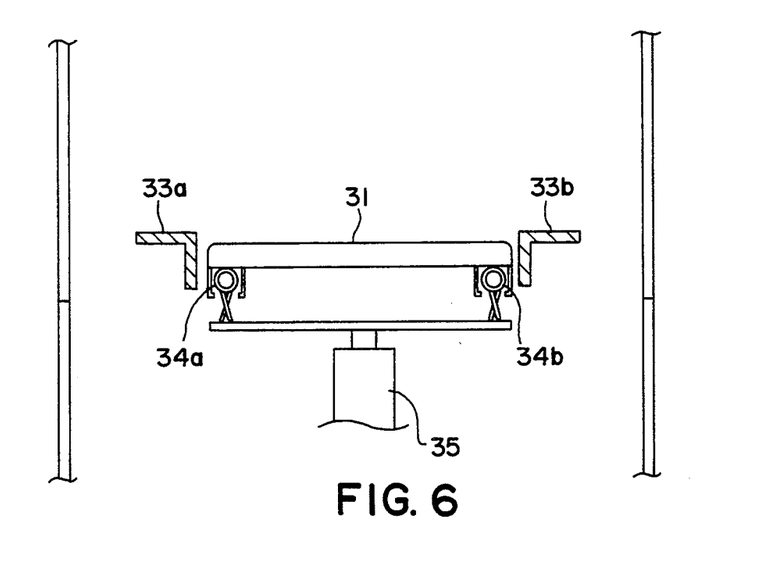
FIG. 6 is an end view of the drum table shown in FIG. 5, illustrating the vertical cylinder for elevating the drum tables above the support rails.

As best shown in FIGS. 4, 5, and 6, each of the drum tables 31a-f are slidably connected to guide rails 34a and 34b located between the drum support rails 33a,b. The guide rails 34a,b operate to support and guide the drum tables 31a-f as the drum tables 31a-f carry respective drums 11 downstream from station to station. Preferably, the guide rails 34a,b and drum support rails 33a,b extend continuously from the drum emptying station 13 to the drum exit conveyor 19. Air cylinders 30 function to reciprocate the respective drum tables 31a-f laterally along the guide rails 34a,b.

Vertical air cylinders 35 are located beneath the drum tables 31 to raise the guide rails 34a,b and drum tables 31a-f upwardly above the drum support rails 33a,b, and to lower the guide rails 34a,b and drum tables 31a-f downwardly below the drum support rails 33a,b. Preferably, several vertical cylinders 35 are positioned in spaced-apart relation within the lower cabinetry 23 of the drum processing stations.

The simultaneous downstream movement of drums 11 occurs by raising the drum tables 31a-f upwardly above the support rails 33a,b by operation of the vertical cylinders 35. When raised, the weight of the drums 11 is transferred from the support rails 33a,b to the drum tables 31a-f. The drum tables 31a-f then slide downstream along the guide rails 34a,b by operation of the lateral cylinders 30. When properly positioned, the drum tables 31a-f lower and transfer the drums 11 to the support rails 33a,b of the succeeding drum processing station. The drum tables 31a-f then slide back upstream to their original position below the support rails 33a,b of the adjacent drum processing station.

According to another embodiment, the drum table 31a may operate independent of drum tables 31b-f. The drum table 31a would reciprocate laterally from the drum emptying station 13 to the first rinse station 14 to move a drum 11 downstream from the drum emptying station 13 to the first rinse station 14. As the drum 11 is being placed in the first rinse station 14, succeeding drums 11 are moved downstream to respective downstream drum processing stations.

Operation of the Drum Processing Apparatus

As shown in FIG. 2, when a first drum 11 is ready for processing, it is initially transferred from a drum collection area 40 to a gravity feed decline conveyor 41 which transports the drum to an 8-drum accumulating conveyor 42. The accumulating conveyor 42 transports the eight drums 11 in succession to a drum feed conveyor 43 located near the entrance side of the apparatus 10. The drum feed conveyor 43 moves the drums 11, one drum at a time, to a first drum processing station of the drum processing apparatus 10 where the drums 11 are subsequently decontaminated, disposed of, or reconditioned in succession.

Drum Deheading Station

Referring now to FIG. 7, the first drum processing station is the drum deheading station 12. The drum deheading station 12 includes deheading means for removing a top lid 70 of the drum 11. According to one embodiment, the deheading means is a high frequency torch 51, such as a plasma torch, having a torch head 52 through which a metal cutting flame jet extends. The torch 51 is attached to and extends downwardly from the perimeter of a deheading table 53 located above the drum 11.

The deheading table 53 rotates, and vertically reciprocates between a lid-cutting position and a retracted position. A double-end cylinder 54 cooperates with a vertically extending table support rod 55 to move the deheading table 53 downwardly into surface contact with the top of the drum 11, and upwardly away from the drum 11. A rotary cylinder 56 positioned above the double-end cylinder 54 cooperates with a drive chain or belt 57 connected to the table support rod 55 to rotate the deheading table 53 through an approximate 380 degree cycle. A predetermined light sensitive photo eye 58 operates to position the drum 11 substantially in the center of the deheading table 53 for cutting. The photo eye 58 commands forward movement of the drum 11 by generating an infrared beam which extends from one side wall 25a of the deheading station 12 to the opposing side wall 25b. A reflector is located on the opposing side wall 25b to reflect the infrared light back to the photo eye 58. When the beam is tripped or broken by the drum 11, the forward movement of the drum 11 is stopped.

Preferably, the deheading station 12 includes several light sensitive photo eyes 58 spaced-apart at given intervals on the opposing side walls 25a,b of the station 12. The various photo eyes 58 correspond to various drum diameters. Once the dram 11 is properly positioned beneath the deheading table 12, drum deheading is ready to proceed.

As the deheading table 53 moves downwardly towards the top lid 70 of the drum 11 by operation of the double-end cylinder 54, a knife 59 located on the deheading table 53 pierces and vents the drum 11 to relieve any internal pressure within the drum 1! . A set of roller bearings 60a and 60b located on the deheading table 53 act to engage the top of the drum 11, and to halt the downward movement of the deheading table 53 and torch 51. Once the movement of the deheading table 53 has stopped by means of a limit switch, the torch 51 positions itself for cutting.

The torch 51 is preferably connected to the deheading table 53 by means of a laterally extending slide rod 62. An air cylinder 64 cooperates with the slide rod 62 to move the torch 51 and torch head 52 inwardly into flame-engaging relation to the drum surface, and outwardly away from the drum 11. When properly positioned, the torch 51 is activated, and the deheading table 53 is rotated through an approximate 10-second 380 degree cycle by means of the rotary cylinder 56. The torch head 52 and flame jet are rotated about the entire perimeter of the drum 11. The roller bearings 60a,b engage the top surface of the lid 70 during rotation, thus allowing the deheading table 53 to follow the top surface contours of the particular drum 11. The torch head 52 is thereby maintained in flame-engaging relation to the top lid 70 of the drum 11 throughout the entire deheading table 53 rotation. The torch 51 is designed to successfully function within a range of plus or minus one-half ($\frac{1}{2}$) inches to accommodate significantly damaged drums 11.

Figure 8:
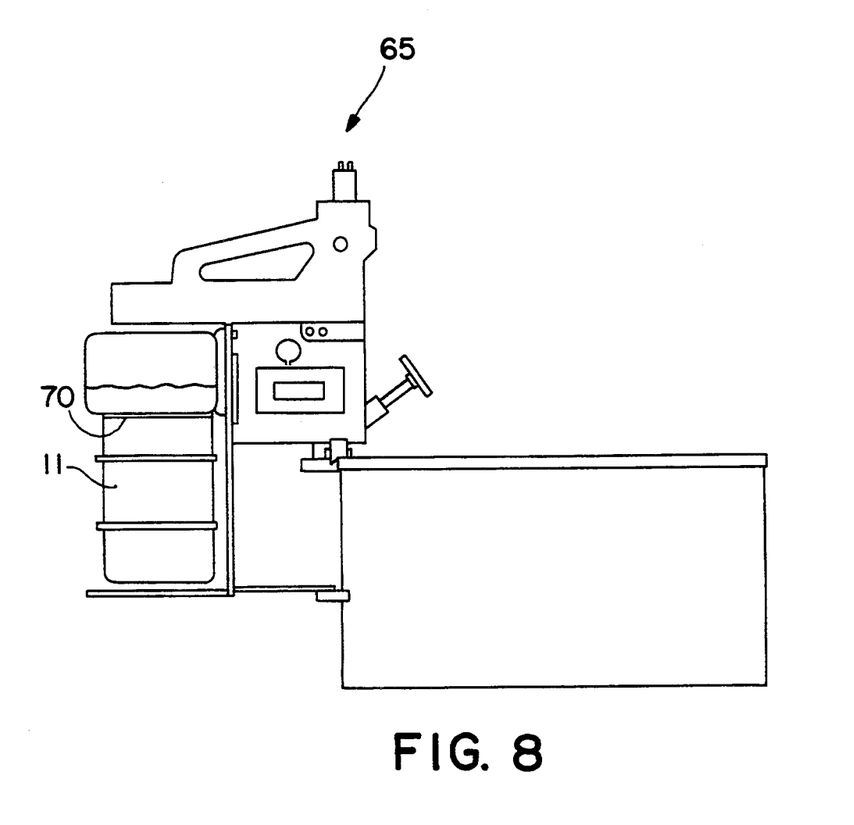
FIG. 8 is a side elevation of a non-flammable, explosion-proof drum deheading device according to an alternate embodiment of the invention.

When the 380 degree rotation is complete, the air cylinder 64 moves the slide rod and torch head away from the drum, and the double-end cylinder 54 moves the deheading table 53 upwardly back to its previous retracted position. The drum 11 is then ready to be passed to the next drum processing station. As the first drum 11 moves downstream, a second drum 11 is transferred from the feed conveyor 43 to the drum deheading station If the drum 11 contains a flammable product, the drum deheading means would comprise an electrical non-flammable, explosion-proof lid remover 65, shown in FIG. 8, such as that manufactured by the Wizard Drum Tool Co. under the trademark "Wizard". Alternately, the non-flammable device is a mechanical lid remover (not shown) having a drum support cradle and knife. The knife operates to pierce and cut the drum lid, as the drum support cradle rotates the drum substantially 360 degrees relative to the knife.

Lid Processing

Figure 9:
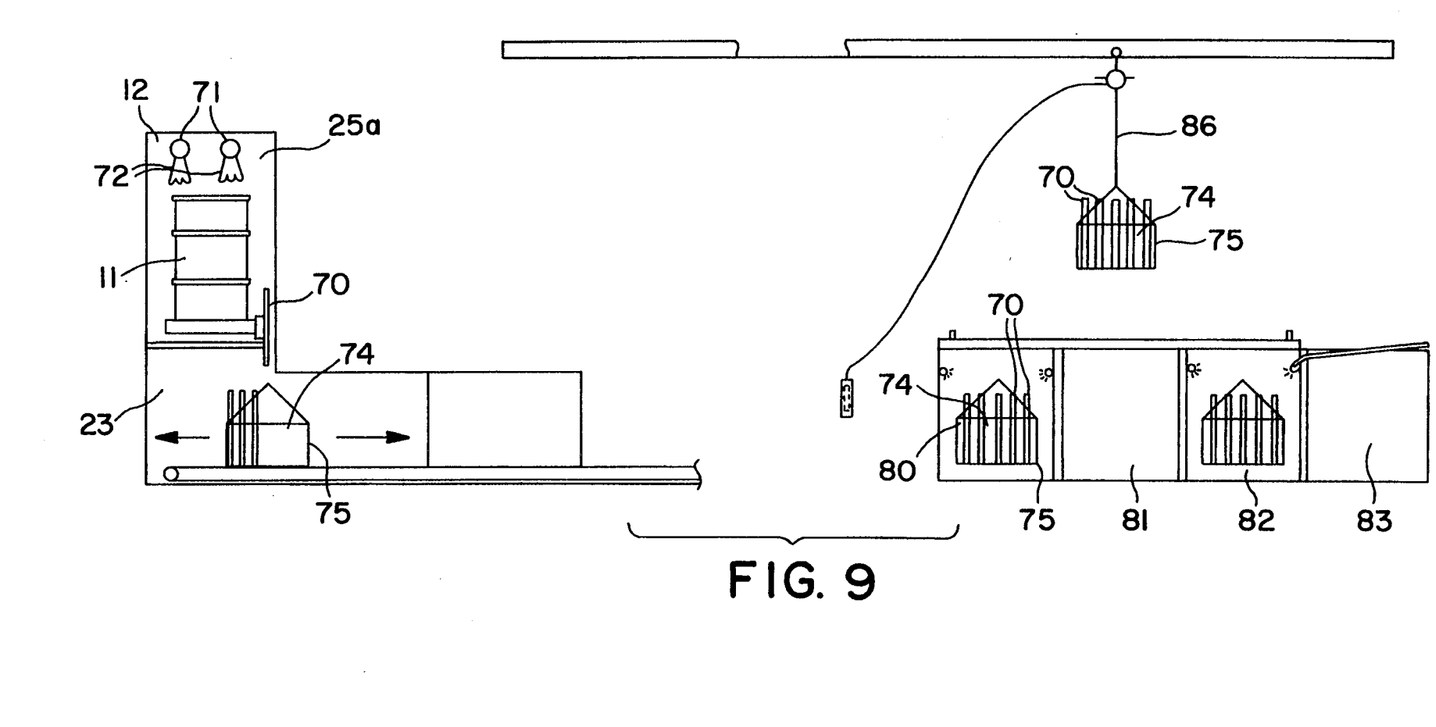
FIG. 9 is a side elevation of the lid processing area.

Once the lid 70 of the drum 11 has been successfully cut, the lid 70 is ready for decontamination in a lid processing area. To remove the lid 70 from drum 11, the supervisor places his hands into a set of glove holes 71 formed in a side wall 25a of the deheading station 12, as shown in FIG. 9. A set of industrial rubber gloves 72 extend from the glove holes 71 into the deheading station 12 for allowing the supervisor to pick up the lid 70 and separate it from the drum 11. Preferably, an upper window (not shown) located above the glove holes 71 permits the supervisor to view the lid removal. Once the lid 70 is removed, the supervisor drops it into a lid basket 74 located in the lower cabinetry 23 of the deheading station 12. Alternately, in an automated system, a magnetic device (not shown) would separate the severed lid 70 from the drum 11 and drop it into the lid basket 74 for processing.

After the first lid 70 drops into the basket 74, a time delay of approximately 5 to 10 seconds ensues and the basket 74 is automatically advanced one position (2 inches). This process continues for a series of eight lids 70 per basket 74, as successive drums 11 pass through the deheading station 12. Once the eighth lid 70 is dropped into the basket 74, a chain-driven rack 75 which holds the basket 74 makes its limit. The rack 75 and basket 74 are then moved to an entrance side of the lid processing area.

When set for processing, the supervisor hoists the lid basket 74 out of the rack 75 and drops it into a pre-rinse bath 80 for a 2½ to 5 minute rinse cycle. Once the pre-rinse of the lids 70 is complete, a hoist 86 picks the basket 74 up and lowers it into an ultrasonic cleaning unit 81 for 2½ to 5 minutes of secondary cleaning. The duration for this cleaning phase may vary depending upon the condition of the lids 70. A second basket 74 of lids 70 can now be placed into the pre-rinse bath 80. Once the cycle in the ultrasonic cleaning unit 81 is complete, the supervisor raises the first basket 74 and places it into a final rinse bath 82. The second basket 74 is now carried over to the ultrasonic cleaning unit 81, and a third basket 74 is placed into the pre-rinse bath 80. When lid processing in the final rinse bath 82 is complete for the first basket 74, the first basket 74 is raised and placed on a drain table 83. Run-off fluid from the drain table 83 is preferably recycled back into the final rinse bath 82. Once the lids 70 are dried, they may be discarded into a waste bin (not shown). Alternately, ring-clamp type lids relatively undamaged may be reconditioned for reuse. FIG. 2 best illustrates the location of the lid processing area with respect to the processing stations of the drum processing apparatus 10.

Drum Emptying Station

The second drum processing station is the drum emptying station 13, shown in FIG. 7. The drum emptying station 13 includes emptying means for emptying the drum contents through the resulting opening in the drum 11 where the now removed lid 70 once existed. Preferably, the drum emptying means is a drum invertor 90 which cradles the drum 11 and inverts the drum 11 substantially 180 degrees. When inverted, the contents of the drum 11 passes out of the drum 11 and into a discharge hopper 91. The discharge hopper 91 is located beneath the drum invertor 90 and acts to collect the discharged product. Preferably, the drum 11 is maintained in the inverted position throughout the remaining processing stations.

According to one embodiment, the discharge hopper 91 is a tapered cone-shaped hopper, off-centered approximately 18 inches to direct the product downwardly and inwardly towards a center portion of the hopper where a smaller opening 93 is located. Vibrators 94 are located on the sides of the hopper 91 to promote movement of any product accumulating on the tapered interior walls of the hopper 91. A discharge hopper 91 of this construction is best suited for handling a dry powder product.

The smaller opening 93 at the base of the hopper 91 directs the product flow out of the hopper 91 to a laterally extending screw conveyor 95. The screw conveyor 95 transports the product to a separation sizing unit 96 where the product is sieved. Larger, more dense chunks of product pass to a waste disposal 97. From the separation sizing unit 96, the smaller chunks of product are carried through a bucket elevator 98 to the top of a storage silo 99 for processing.

In the case of drums containing a liquid product, the discharge hopper would comprise a discharge tank (not shown) having anti-splash baffles located at the mouth of the tank. Preferably, a flexible connection would extend from the discharge tank for attachment to one or more processing silos. The various processing silos would handle separate liquid products, so that drums containing various liquids could be processed through the drum processing apparatus 10 by simply changing the flexible connection to the appropriate processing silo. A clean-in-place (CIP) tank and pump would operate to rinse the discharge tank after each one of the various liquids has passed through the discharge tank and flexible connection.

The drum 11 has now been deheaded and inverted, and is ready to proceed to the wet-end portion of the drum processing apparatus 10. As the vertical section doors 27 between each station 12–18 rise upwardly, the drum tables 31a–f pick up their respective drums 11, as described above, and simultaneously advance them to the succeeding drum processing station.

First Rinse Station

Figure 10:
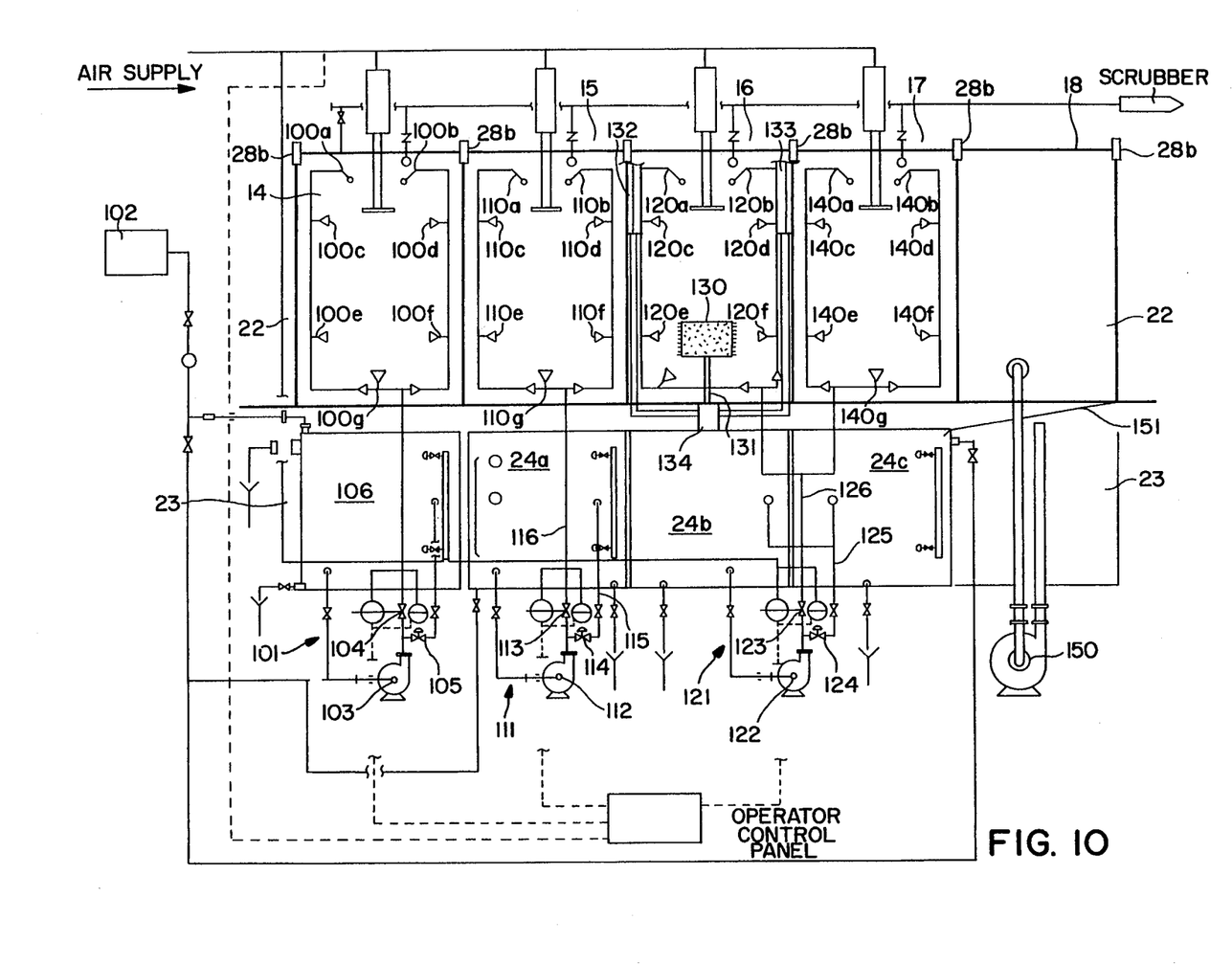
FIG. 10 is a side elevation of the various drum cleaning stations and the drum dryer station, illustrating the various pumps and piping according to one embodiment of the invention.

Referring to FIG. 10, the first rinse station 14 is the first wet-end station of the drum processing apparatus. The first rinse station 14 includes several high-pressure spray nozzles 100a–g for rinsing the interior and exterior surfaces of the drum 11. Preferably, the spray nozzles 100a–g are designed to emit fluid at about 80 psi. To prevent the rinsing fluid from gathering on the top surface of the drum 11, the drum 11 may be pierced before rinsing.

Preferably, two spray nozzles 100a and 100b are located in an upper area of the station 14, while four spray nozzles 100c–f are located in an intermediate area. Additionally, one spray nozzle 100g is located in a lower area of the station 14. The upper spray nozzles 100a,b are spaced-apart to uniformly rinse the entire exterior surface of the drum. The lower spray nozzle 100g is designed to spray rinse the interior of the drum 11, shooting a cleansing fluid upwardly into the drum 11. Each of the spray nozzles 100a–g are connected to a piping assembly 101 communicating with a main fluid source 102, pump 103 and control valves 104 and 105. The control valves 104 and 105 are designed to direct fluid through the spray nozzles 100a–g during a 30 second rinsing cycle while all vertical section doors 27 are closed. According to one preferred embodiment, the cleansing fluid is water.

A portable tank 106 is located in the lower cabinetry 23 of the first rinse station 14, and serves to collect the cleansing fluid and any remaining product which may have adhered to the interior surface of the drum 11 after emptying. The portable tank 106 is moved from the lower cabinetry 23 and periodically emptied by the system supervisor when necessary. Preferably, a ⅛ inch thick rubber shield (not shown) is attached along the bottom perimeter of the upper cabinetry 22 of the first rinse station 14. The rubber shield overlaps the interior peripheral edge of the portable tank 106 to prevent fluid splashing or fluid carry-over onto the floor.

Once the rinsing cycle of the first rinse station 14 is complete, the control valves 104 and 105 divert fluid flow from the spray nozzles 100a-g back to the portable tank 106, and all vertical section doors 27 are simultaneously raised. The first drum 11 is now reading to be passed to a second drum cleaning station. The succeeding drums 11 likewise proceed to the next downstream station, as previously described.

Neutralizing Station

The second drum cleaning station of the wet-end is a drum neutralizing station 15. Like the first rinse station 14, the drum neutralizing station 15 includes several high-pressure spray nozzles 110a-g for rinsing the interior and exterior surfaces of the drum 11. However, instead of a cleansing fluid such as water, a neutralizing solution is utilized in this station to neutralize any surface chemicals adhering to the drum 11 after initial rinsing. For example, a caustic solution would be used to neutralize acidic contaminants.

Preferably, two spray nozzles 110a and 110b are located in an upper area of the neutralizing station 15, while four spray nozzles 110c-f are located in an intermediate area. Additionally, one spray nozzle 110g is located in a lower area of the station 15. The upper spray nozzles 110a,b and intermediate spray nozzles 110c-f are spaced-apart to uniformly rinse the entire exterior surface area of the drum 11. The lower spray nozzle 110g is designed to spray rinse the interior of the drum 11, shooting the neutralizing fluid upwardly through the opening 32 in the drum table 31.

A containment tank 24a is located in the lower cabinetry 23 of the neutralizing station 15 for collecting and recycling the neutralizing fluid emitted from the spray nozzles 110a-g. Preferably, the containment tank 24a is initially filled with the neutralizing fluid to about 50% capacity. A piping assembly 111 communicates with the containment tank 24a and spray nozzles 110a-g to transfer the fluid from the tank 24a to the respective spray nozzles 110a-g. Preferably, the neutralizing fluid in the containment tank 24a is continuously recycled from the containment tank 24a to the spray nozzles 110a-g.

A pump 112 cooperates with the piping assembly 111 to draw the neutralizing fluid from the containment tank 24a through the piping assembly 111, and to the spray nozzles 110a-g. The pump 112 is preferably rated for 35 psi at 25 gallons per minute.

According to one preferred embodiment, the piping assembly 111 extends from the tank 24a to the pump 112, and then diverges into two sections. The first piping section is a by-pass section 115 defining a flow path leading back to the containment tank 24a. The second piping section is an in-line section 116 defining a flow path leading to the respective spray nozzles 110a-g. First and second control valves 113 and 114 operate to direct fluid flow either through the in-line section 116 to the spray nozzles 110a-g, or through the by-pass section 115 back to the containment tank 24a.

When the supervisor initiates processing, the control valves 113 and 114 are adjusted to direct fluid flow to the spray nozzles 110a-g. Once the timed neutralizing Cycle is complete, the control valves 113 and 114 shift fluid flow back to the containment tank 24a, and processing in the neutralizing station 15 is complete.

The first drum 11 is now ready to move to a succeeding drum cleaning station. As the vertical section doors 27 are raised, the drum table 31 lifts the first drum 11 from the support rails 34a,b and passes it to the next processing station. All succeeding drums 11 are simultaneously passed to the next drum processing station.

Brush and Rinse Station

The brush and rinse station 16 of the drum processing apparatus 10 includes several high pressure spray nozzles 120a-g, like that previously described. Additionally, a vertically reciprocating and rotatable brush 130 reciprocates through the opening 32 in the drum table 31 and into the interior of the drum 11. As the brush 130 moves into the drum 11, it rotates to clean away any remaining product film from the interior surface of the drum 11.

Preferably, two of the high-pressure spray nozzles 120a and 120b are located in an Upper area of the brush and rinse station 16, while four spray nozzles 120c-f are located in an intermediate area. Additionally, one spray nozzle 120g is located in a lower area of the station 16. The upper spray nozzles 120a,b and intermediate spray nozzles 120c-f are spaced-apart to uniformly rinse the entire exterior surface area of the drum 11. The lower spray nozzle 120g is designed to spray rinse the interior of the drum 11, shooting the rinsing fluid upwardly into the drum 11. According to one embodiment, the rinsing fluid is water.

Preferably, the brush 130 is positioned on a center cylinder 131, and cooperates with two outside cylinders 132 and 133 to clean the interior of the drum 11. The two outside cylinders 132 and 133 raise the brush 130 upwardly through the drum table 31 to the mouth of the drum 11. The center cylinder 131 then operates to reciprocate the brush 130 between an up and down position inside the drum 11. The outside cylinders 132 and 133 further act to trigger a hydraulic motor 134 which turns or rotates the brush 130 as the brush 130 moves within the drum 11.

A second containment tank 24b located in the lower cabinetry 23 of the station 16, and cooperates with pump 122 to supply and recycle the rinse fluid to the spray nozzles 120a-g. The fluid is passed through the spray nozzles 120a-g as valves 123 and 124 in the piping assembly 121 divert flow from the by-pass section 125 to an in-line section 126 of the piping assembly 121, as previously described.

Once fluid spray has been initiated, the two outside cylinders 132 and 133 which support the single center cylinder 131 begin to retract. This causes the center cylinder 131 to move the brush 130 upwardly into the mouth of the drum 11. When the outside cylinders 132 and 133 make a proximity switch, the hydraulic motor 134 is energized and begins rotating the brush 130. The center cylinder 131 then moves upwardly towards the top of the drum 11, advancing the rotating brush 130 through the full depth of the drum 11. After reaching full extension, the center cylinder 131 retracts by means of the two outside cylinders 132 and 133, thus lowering the brush 130 back to its original position beneath the drum table 31.

Final Rinse Station

The final rinse station 17 of the drum processing apparatus 10 is similar to the first rinse station 14 described above. Several high-pressure spray nozzles 140a-g act to rinse the interior and exterior surfaces of the drum 11. Preferably, two of the high-pressure spray nozzles 140a and 140b are located in an upper area of the final rinse station 17, while four spray nozzles 140c–f are located in an intermediate area. Additionally, one spray nozzle 140g is located in a lower area of the station 17. The upper spray nozzles 140a,b and intermediate spray nozzles 140c–f are spaced-apart to uniformly rinse the entire exterior surface area of the drum 11. The lower spray nozzle 140g is designed to spray rinse the interior of the drum 11, shooting the rinsing fluid upwardly into the drum 11. According to one embodiment of the invention, the cleansing fluid is water. Preferably, a third containment tank 24c is located in the lower cabinetry 23 of the station 17. The containment tank 24c cooperates with a piping assembly 121, the pump 122, valves 123 and 124, and in-line and bypass sections 125 and 126 to collect and recycle the rinsing fluid as previously described.

Drum Dryer Station

Once finally rinsed, the drum 11 is ready for drying in the drum dryer station 18. A blower motor 150 located beneath the drum table 31 operates to drive air upwardly into the interior of the drum 11. Preferably, the blower motor 150 moves air in this station 18 at approximately 1200 CFM. A drip pan 151 is located below the drum 11 for collecting run-off from the drum 11. The drip pan 151 is preferably sloped to move the captured fluid back into the containment tank 24c of the final rinse station 17.

The blower motor 150 preferably goes through two cycles to ensure complete removal of any standing fluid from the top surface of the drum 11. Once processing in the dryer station 18 is complete, the first drum 11 is ready to be scraped. The supervisor advances each of the preceding drums 11 to their respective succeeding stations.

Drum Crusher

Referring back to FIGS. 1 and 2, at the drum exit side of the drum processing apparatus 10, various drum disposal machines conventional in the art may be fitted for properly disposing of the fully processed drum 11. For example, an exit conveyor 160 could lead to the mouth of a drum shredder 170 into which processed drums 11 would fall and be scrapped. The drum processing apparatus 10 could include a shredder for handling metal or plastic drums.

Alternately, the drum processing apparatus 10 does Dot include a drum shredder 170 so that certain drums can be processed for reuse. According to another embodiment of the invention (not shown), the drum processing apparatus includes a detour conveyor for diverting drums from the drum disposal machine to a drum fill device for refilling drums with a product once they have been reconditioned.

The various cylinders described above for moving components such as the vertical section doors 27, the drum table 31, and the brush 130 may be either hydraulic, air, or air over oil. Other elements, such as the pumps and motors, comprise elements known in the art whose particular features and characteristics may vary depending upon the use application.

When processing drums 11 containing a liquid product, it may be unnecessary to first remove the lid 70 of the drum 11 before cleaning. The liquid product could be poured out of the drum through the bung, and the drum 11 would subsequently be passed to one or more cleaning stations for processing.

A drum processing apparatus is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. A drum processing method of purging and decontaminating successive product-containing storage drums, said drum processing method comprising:
   (a) placing the drum on a conveyer for moving the drum downstream to successive drum processing stations;
   (b) removing a lid of the drum in a drum deheading station to provide an opening at one end of the drum;
   (c) emptying the contents of the drum through said opening in the drum in a drum emptying station; and
   (d) cleaning the drum in at least one drum cleaning station downstream of said drum emptying station to remove contaminants from the interior and exterior surfaces of the drum, said cleaning step further comprising the step of passing the drum through a neutralizing station for rinsing the interior and exterior surfaces of the drum with a neutralizing liquid solution.

2. A drum processing method according to claim 1, wherein said lid removing step comprises the step of applying a high frequency plasma torch to the exterior surface of the drum.

3. A drum processing method according to claim 1, wherein said lid removing step comprises the step of applying a non-flammable, explosion-proof cutting device to the lid of the drum and then rotating the cutting device substantially 360 degrees relative to the drum to thereby separate the lid from the drum.

4. A drum processing method according to claim 1, wherein said drum emptying step comprises the step of placing the drum in a drum invertor for substantially inverting the drum to thereby empty the contents.

* * * * *